Dec. 16, 1969 R. H. FOOTE ET AL 3,484,712
ADAPTIVE SYSTEM AND METHOD FOR SIGNAL GENERATION
Filed Oct. 13, 1967 8 Sheets-Sheet 1
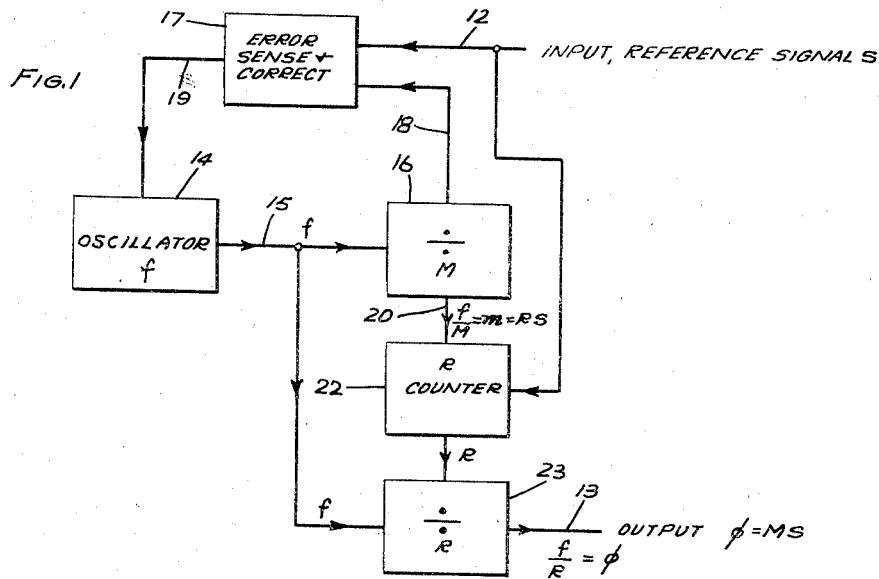
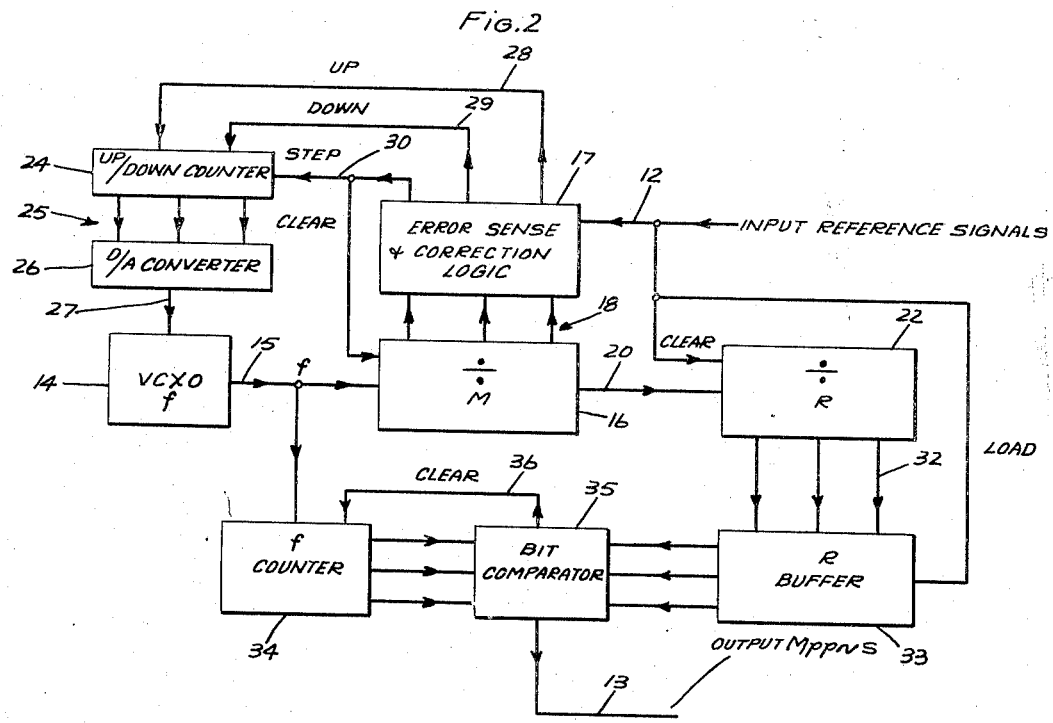
INVENTORS:
DONALD A. FIGGINS,
RICHARD H. FOOTE,
Hood, Gust & Irish
ATTORNEYS.

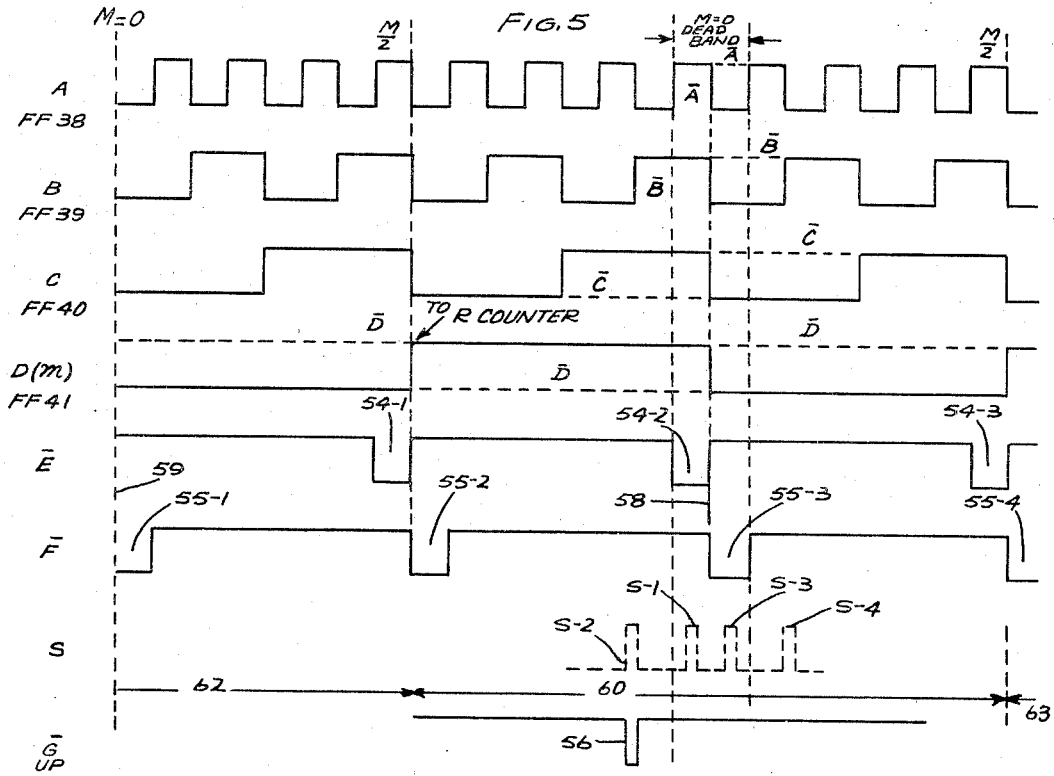

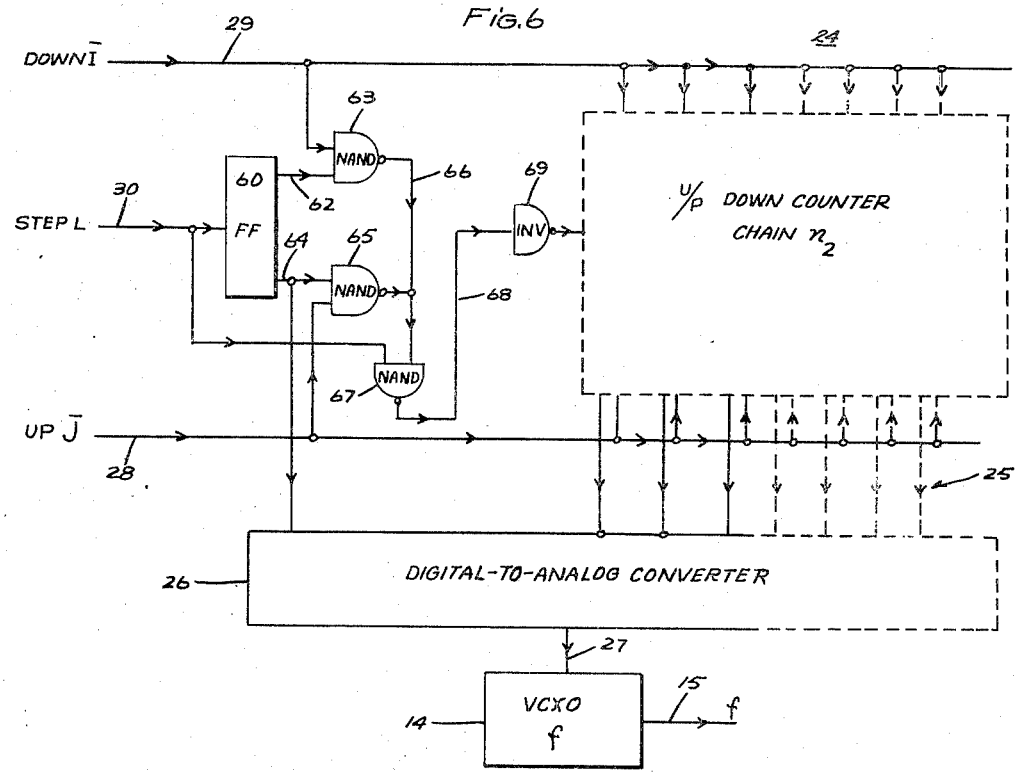
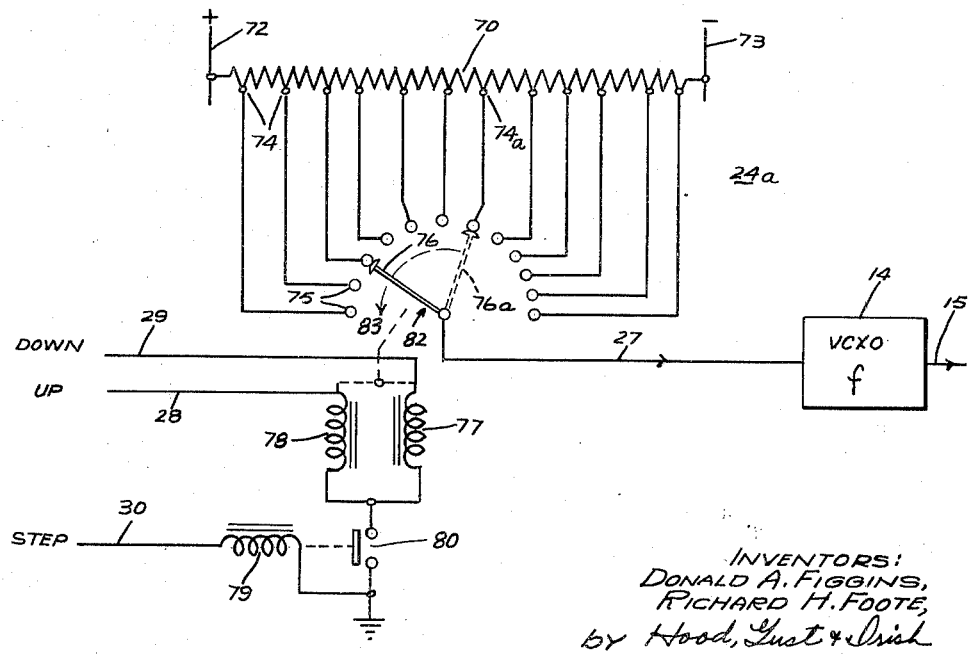

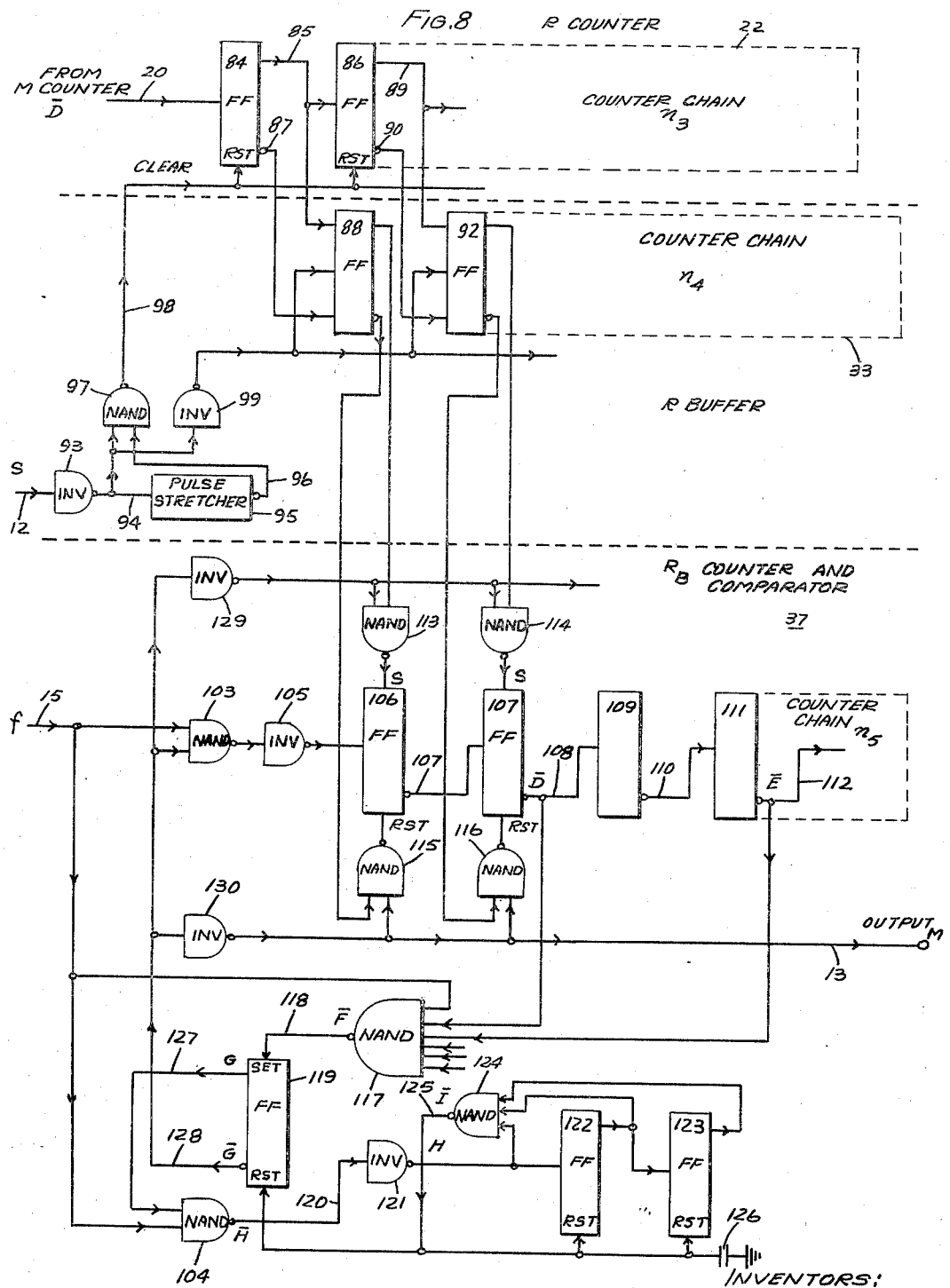

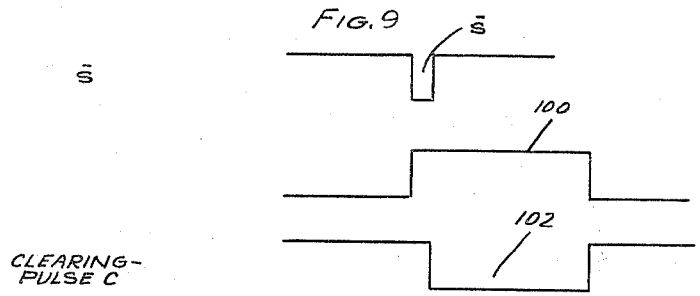
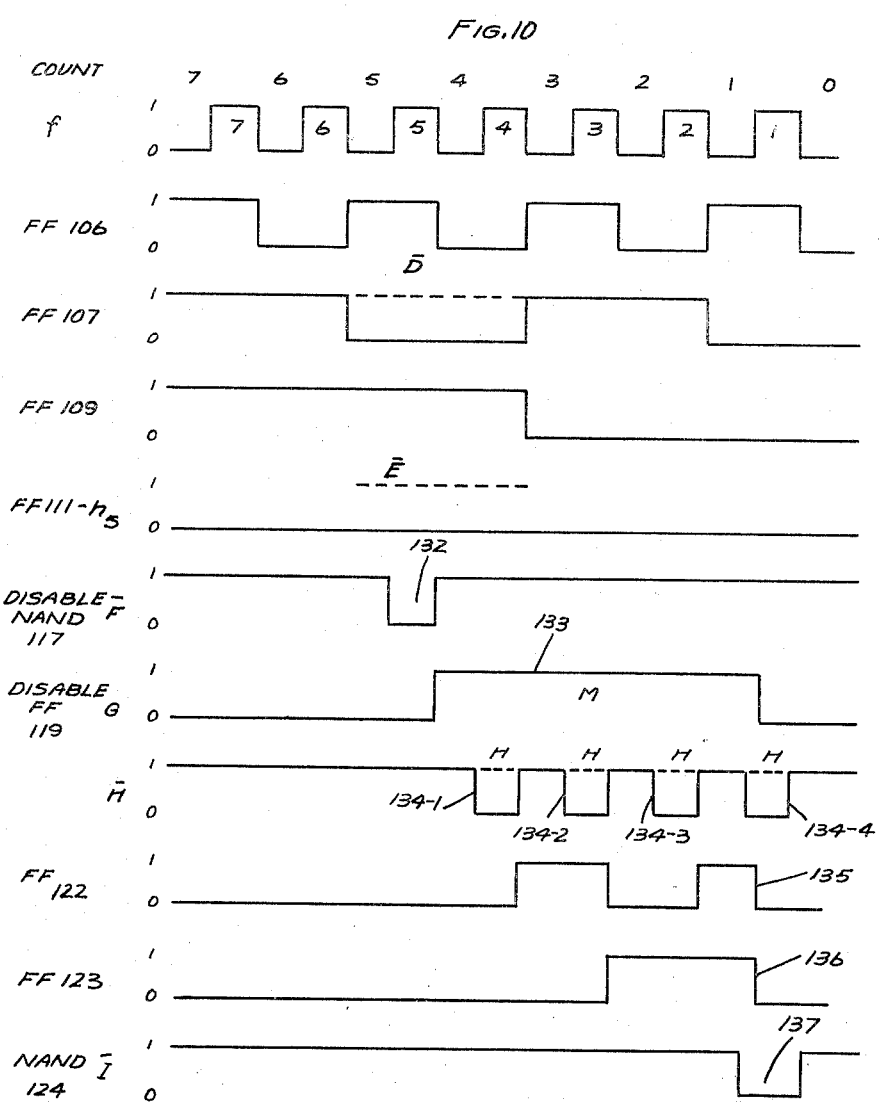

Dec. 16, 1969  R. H. FOOTE ET AL  3,484,712
ADAPTIVE SYSTEM AND METHOD FOR SIGNAL GENERATION
Filed Oct. 13, 1967  8 Sheets-Sheet 7
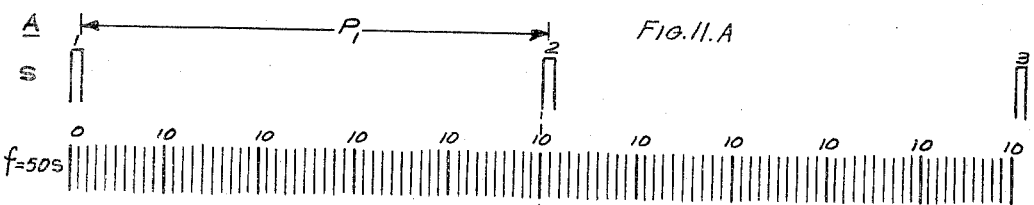
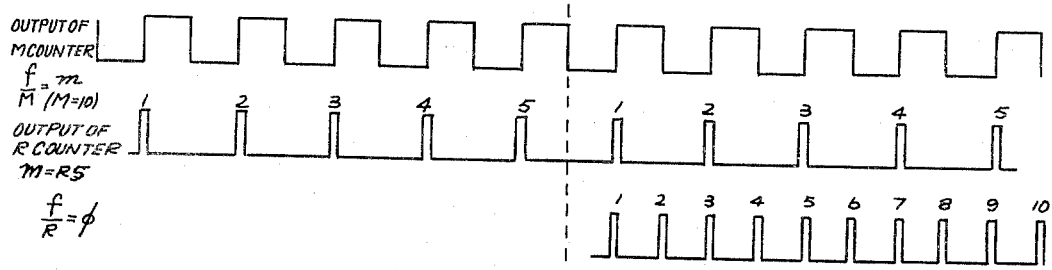
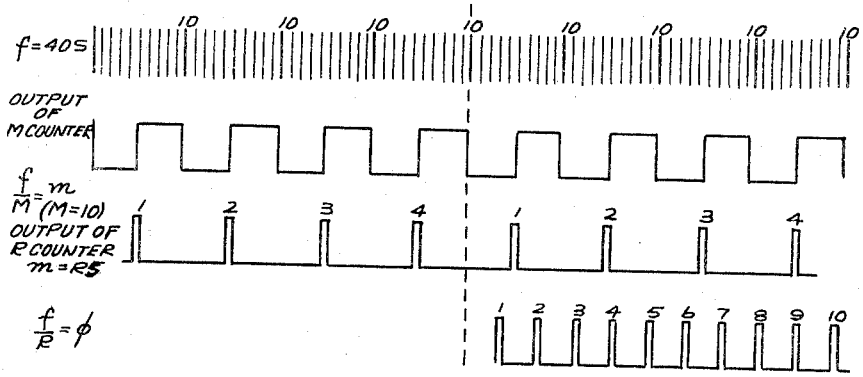
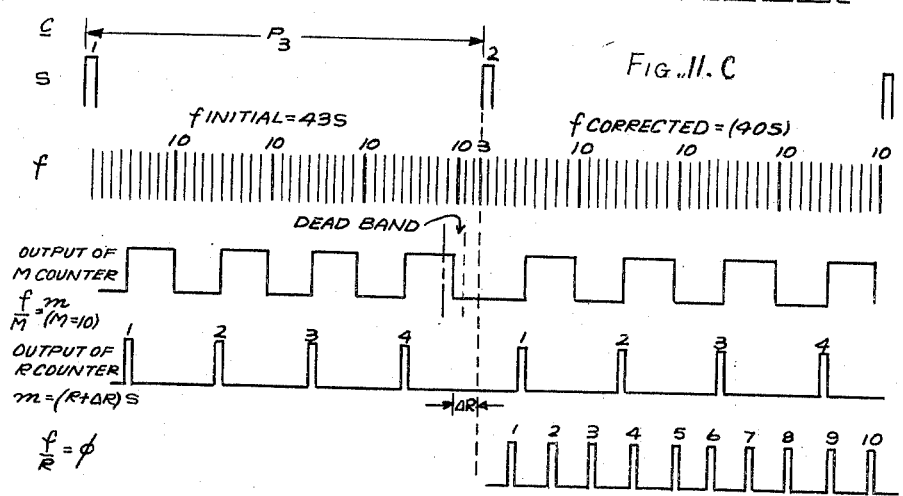
INVENTORS:
DONALD A. FIGGINS,
RICHARD H. FOOTE,
by Hood, Just & Drish
ATTORNEYS.

Dec. 16, 1969  R. H. FOOTE ET AL  3,484,712
ADAPTIVE SYSTEM AND METHOD FOR SIGNAL GENERATION
Filed Oct. 13, 1967  8 Sheets-Sheet 8
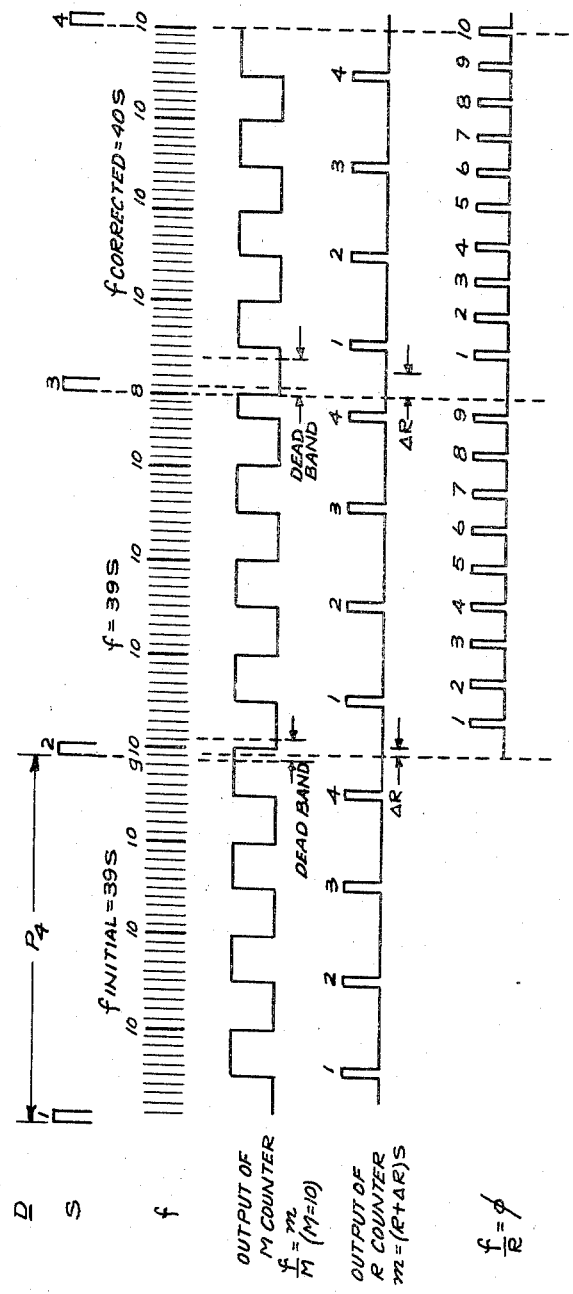
INVENTORS:
DONALD A. FIGGINS,
RICHARD H. FOOTE,
by Hood, Gust & Irish
ATTORNEYS.

United States Patent Office 3,484,712
Patented Dec. 16, 1969

3,484,712
ADAPTIVE SYSTEM AND METHOD FOR SIGNAL GENERATION
Richard H. Foote, and Donald A. Figgins, Fort Wayne, Ind., assignors, by mesne assignments, to the United States of America as represented by the Administrator of the National Aeronautics and Space Administration
Filed Oct. 13, 1967, Ser. No. 675,238
Int. Cl. H03b 3/04
U.S. Cl. 331—18                            19 Claims

ABSTRACT OF THE DISCLOSURE

A system and method for generating a predetermined integral number M of equally spaced signals during the period of time between recurrent reference signals subject to broad variation in frequency. A variable frequency oscillator is provided for generating a first train of signals having a frequency $f$. The frequency $f$ is divided by the integer M to provide a second train of signals having a frequency $m$ by repeatedly counting the signals of the first train from zero to M and providing a signal of the second train in response to each M count. The direction and magnitude of any deviation of the frequency $m$ from an integral multiple R of the frequency of the reference signals is sensed by detecting, in response to a reference signal, whether the M count differs from zero in excess of a predetermined count and the direction of such difference. Error signals are provided in response to such excess and means are provided coupled to the oscillator for increasing or decreasing the frequency $f$ in response thereto thereby to reduce the deviation in the frequency to zero. The number of cycles R of the second train of signals occurring during one period of the reference signals is counted by counting the signals of the second train and resetting the counting means to a zero count in response to each reference signal. The frequency $f$ is divided by the number R, thereby to provide the number M of signals during each period of the reference signals, by transferring each R count previously accumulated to buffer count storage means in response to a reference signal, counting the signals $f$ of the first train, and comparing the count in the buffer storage means with the count of the signals of the second train thereby to provide an output signal in response to each R signals of the first train. Thus, when the frequency $f$ of the first train of signals has been adjusted so that the frequency $m$ of the second train of signals is an integral multiple R of the frequency of the reference signals, division of the frequency $f$ by R results in the generation of a train of output signals having a frequency which is an integral multiple M of the frequency of the reference signals, i.e., the generation of an integral number M of equally spaced signals during the period of the reference signals.

BACKGROUND OF THE INVENTION

Field of the invention

This invention relates generally to a system and method for generating a train of timing increments between recurrent events, and more particularly to an adaptive system and method for generating a precise number of signals during a period of time between recurrent signals subject to broad variation in frequency.

Description of the prior art

Numerous automatic frequency control systems have been provided for automatically locking an oscillator to a reference frequency, i.e., for automatically maintaining the oscillator frequency at some multiple of the reference frequency. Examples of such prior systems are shown in Patents Nos. 2,982,921 and 3,259,851. In such prior systems, a reactance-controlled variable frequency oscillator has been employed and the reference frequency is generally the line frequency which therefore is not subject to wide variation.

Summary of the invention

There are instances where it is desired to provide a predetermined number of precise timing increments between recurrent events, the period of which is subject to wide variation. More particularly, it is desired to generate a precise number of timing signals in a period of time between the signals of a reference frequency which is subject to a broad long term variation in frequency. More particularly, it is desirable to provide an adaptive or acquisitive system and method for generating timing signals which will automatically adjust to some unknown reference frequency which can be within very broad limits. Furthermore, the reference signal may be subject to short term transient variation or jitter as opposed to long term variation, and it is further desirable that such a system be sensitive only to long term variation in the reference frequency, i.e., be insensitive to short term variation. It is further desirable that the frequency of the timing or clock signals be highly stable while still subject to variation to maintain a predetermined fixed relationship with the reference frequency.

In a specific application, it is desired to provide a fixed number of clock pulses during each 360 degree rotation of a satellite. These clock pulses are employed to generate one television scanning line during each successive rotation of the satellite, it being necessary that the line scan be moved precisely by one picture element in the frame direction each rotation. In this application, the reference frequency is a train of sun pulses, one sun pulse being generated by a sensing element each rotation of the satellite. The problem is complicated by the fact that the initial spin rate of the satellite may fall in a very wide range, and further by the fact that the initially established spin rate is subject to change, both intentionally and from undesired effects. Thus, a clock pulse generating system and method is required which is capable of automatically adjusting the clock pulse frequency in accordance with the spin speed of the satellite, i.e., the sun pulse frequency. However, the satellite spin speed cannot be readily determined due to the fact that the sun sensor signal contains noise which provides the effect of jitter or a transistory change in the sun signal period. Thus, the presence of noise in the sun sensor signal gives rise both to an inaccurate position reference and to an inaccurate spin speed if used to control the clock pulse frequency on a rotation-to-rotation basis. It is thus further desirable to integrate a large number of sun sensor signals over a long averaging period. Finally, it is desired that a clock pulse frequency, while subject to automatic control in response to long term variation in the sun sensor signal frequency, nevertheless be highly stable. This dictates the employment of a voltage controlled crystal oscillator; however, the frequency of such an oscillator can be varied only a few tenths of a percent about its center frequency, while the frequency of the reference sun sensor signal may vary as much as three to one.

In accordance with the broader aspects of the invention, a system and method is provided for generating a train of output signals having a frequency which is a predetermined integral multiple M of a train of reference signals having a frequency subject to broad, long term variation. A first train of signals having a frequency $f$ is generated, the frequency $f$ being divided by the integer M to provide a second train of signals having a frequency $m$. The direction and magnitude of any deviation of the frequency $m$ from an integral multiple R of the reference frequency is sensed and the frequency $f$ is adjusted to reduce such deviation to zero. The frequency $f$ is then divided by the integer R and thus, after variation of the frequency $m$ to reduce the aforesaid deviation to zero, the resultant frequency will be an integral multiple M of the frequency of the reference signal.

It will be seen that the integer R is not predetermined, but may be any integer which is less than the integer M. Thus, since it is only necessary to adjust the frequency $f$ sufficiently so that the frequency $m(f/M)$ goes to the nearest integer R, it will be seen that only a small variation in the frequency $f$ is required in order to provide a wide variation in the output frequency required to maintain the same at the required integral multiple M of the reference frequency.

It is accordingly an object of the invention to provide an improved adaptive system for generating a predetermined exact number of output pulses during the period of repetitive reference signals.

Another object of the invention is to provide an improved adaptive system for generating a train of output signals having a frequency which is a predetermined integral multiple of the frequency of a train of reference signals, the frequency of which is subject to broad variation.

A further object of the invention is to provide an improved adaptive system and method for generating a train of output signals having a frequency which is a predetermined integral multiple of a train of reference signals having a frequency subject to broad variation, such system and method employing a local oscillator, the frequency output of which need be varied only within narrow limits.

Yet another object of the invention is to provide an improved adaptive system and method for generating a train of output signals having a frequency which is a predetermined integral multiple of the frequency of a train of reference signals, which system and method is sensitive to long term variations in the reference frequency beyond predetermined limits but insensitive to variations within such limits.

The above-mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE DRAWINGS

FIG. 1 is a simplified block diagram useful in explaining the system and method of the invention;

FIG. 2 is a complete block diagram showing one embodiment of the invention;

FIG. 5 is a timing diagram useful in explaining the operation of the circuit of FIG. 4;

FIG. 6 is a schematic diagram illustrating the up/down counter of the system of FIG. 2;

FIG. 7 is a schematic diagram showing a simplified form of up/down counter usable in the system of FIG. 2;

FIG. 8 is a schematic diagram showing the R counter, R buffer, and $R_B$ counter and comparator of FIGS. 2 and 3;

FIG. 9 is a timing diagram useful in explaining the operation of the R buffer stage of the circuit of FIG. 8;

FIG. 10 is a timing diagram useful in explaining the operation of the $R_B$ counter and comparator section of the circuit of FIG. 8; and FIG. 11 shows timing diagrams useful in expanding the mode of operation of the system of the invention.

DESCRIPTION OF THE PREFERRED EMBODIMENTS

Figure 3:
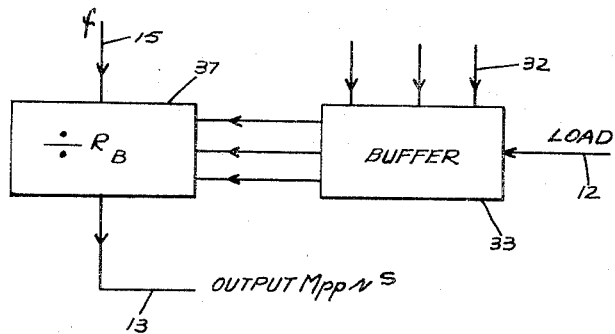
FIG. 3 is a fragmentary block diagram showing a modification of the system of FIG. 2 and the preferred embodiment of the invention.

Referring now to FIG. 1, an input circuit 12 is provided adapted to be connected to the source of a train of reference signals having a frequency S which is known only within broad limits and which may or may not be subject to measurement. The reference signals S may be discrete pulses, as in the case of sun sensor signals in the application discussed above. As indicated, the function of the system shown in FIG. 1 is to generate in output circuit 13 a train of output signals or pulses having a frequency $\phi$ which is a predetermined integral multiple M of the reference signal S, i.e., $\phi = MS$ or M output signals or pulses per cycle or period of the reference signal S.

In accordance with the system and method of the invention, a variable frequency oscillator 14 is provided which generates a first train of signals having a variable frequency $f$ in its output circuit 15a as will be hereinafter described, in the preferred embodiment of the invention, oscillator 14 is a voltage controlled crystal oscillator. Output circuit 15 of oscillator 14 is coupled to a dividing circuit 16 which divides the frequency $f$ by the integer M thereby providing a second train of signals having a frequency $m$, i.e., $f/M = m$. As will shortly be described, the desired output frequency $\phi = MS$ is provided when the frequency $m$ of the second train of signals is equal to another integral multiple R of the reference signal S, i.e., $m = RS$. It will be observed that the integer R must be lower than the integer M and, as will be hereinafter more fully described, a wide range of integers R will be provided in order to accommodate a wide variation in the reference frequency S. Since it is required that $m = RS$, with R being an integer, if the particular frequency $f$ generated at any time by the oscillator 14 yields a frequency $m$ which deviates from an integral multiple R of the reference frequency S, i.e., so that R is not an integer or $m = (R \pm \Delta R)S$, it will be seen that the requisite relationship $m = RS$ can be obtained by variation of the frequency $f$ so as to reduce the deviation $\Delta R$ to zero.

The direction and magnitude of any deviation of the frequency $m$ from an integral or exact harmonic relationship with the reference frequency S, i.e., the magnitude and sign of $\Delta R$, is sensed by an error sensing and correction circuit 17 to which output circuit 18 of dividing circuit 16 and the input circuit 12 are coupled. Error sensing and correction circuit 17 has its output circuit 19 coupled to the oscillator 14 and provides error signals thereto for adjusting the frequency $f$ upwardly or downwardly, as required, in order to reduce the deviation $\Delta R$ to zero so that the frequency $m$ of the second train of signals provided by the dividing circuit 16 equals RS with R being an integer.

Output circuit 20 of dividing circuit 16, in which the frequency $f$ appears, is coupled to a counting circuit 22 to which input circuit 12 is also coupled, counting circuit 22 thus counting the number of cycles of frequency $m$ during one period of the reference signal S. It will be seen that with the oscillator frequency $f$ being adjusted so that the frequency $m = RS$ with R being an integer, the number of cycles counted by the counter 22 during one period of the reference frequency S will be the integer R. Under these conditions, i.e., adjustment of the frequency $f$ so that $m = RS$ with R being an integer, division of the frequency $f$ by the count of R provided by the counter 22 will provide a train of output signals having the frequency $\phi = MS$, i.e., having M equally spaced signals or pulses per period of the reference signal S. Thus, the R counter 22 and the output circuit 15 of the oscillator 14 are coupled to a suitable dividing circuit 23 which performs the division $f/R$.

Summarizing, the operation of the system as shown in FIG. 1 is in accordance with the following equations:

(1) Desired output frequency $\phi = MS$
(2) $M = \phi/S$
(3) $f/M = m$
(4) $m = RS$ ($f$ adjusted so that R is an integer)
(5) $f/m = M$
(6) $f/RS = \phi/S = f/R = \phi$ Referring now to FIG. 2, in the above-described specific application of the system and method of the invention in which it is desired to generate a precise predetermined number M of equally spaced clock pulses during each 360 degree rotation of a satellite as sensed by a recurrent train of sun sensor signals S, the spin speed of the satellite and thus the frequency of the sun signals being subject to broad, long term variation, and it being desired that the frequency of the output clock pulses be highly stable, a voltage controlled crystal oscillator is employed for the oscillator 14. In the preferred embodiment, the pulses of the train of pulses provided by the oscillator 14 are repetitively counted from zero to M by a bistable counting chain 16 which thus provides one signal or pulse of the second train in its output circuit 20 in response to each M pulse of the first train of signals of frequency $f$ provided by the oscillator 14. It will be understood that when the second train of signals of frequency $m$ provided in the output circuit 20 of the M counter 16 has an integral harmonic relationship with the frequency of the reference signals S, i.e., when R is an integer, a reference signal will appear in exact coincidence with a zero account in the M counter 16. However, if the frequency of the first train of signal $f$ is such that the frequency of the first train of signals $f$ is such that the by the counter 16 does not have an exact harmonic relationship with the frequency of the reference signals S, i.e., so that R is not an integer, the contents of the M counter upon the occurrence of a reference signal will differ from zero in a plus or minus direction, thus indicating that the frequency $f$ provided by the oscillator 14 is either too high or too low. The error sensing and correction circuit 17 senses, in response to a reference signal, whether the contents of the M counter 16 differs from zero by a number of counts in excess of that which can be attributed to noise in the reference signal, and the direction of such difference, i.e., whether the difference has a plus sign thus indicating that the frequency is too high or a minus sign thus indicating that the frequency $f$ is too low. If such an excess in the contents of the counter 16 is sensed by the error sensing and correction circuit 17 in response to a reference signal, a one increment correction to the frequency $f$ is made by applying a pulse to the up/down counter 24, the net pulse count provided in the output circuits 25 of the up/down counter 24 being applied to a digital-to-analog converter 26 which has its output circuit 27 coupled to the voltage controlled crystal oscillator 14 and which thus applies an appropriate control voltage thereto.

As will be hereinafter more fully described, sensing of a deficiency in the $f$ count in the M counter 16 upon the occurrence of a reference signal S results in the provision of an "up" signal in output circuit 28 of the error sensing and correction circuit 17 which is coupled to the up/down counter 24, thus indicating that an increase in the frequency $f$ is called for. Contrariwise, sensing of an excess in the $f$ count in the M counter 16 upon the occurrence of a reference signal S will result in the provision of a "down" signal in output circuit 25 of the error sensing and correction circuit 17 which likewise is coupled to the up/down counter 24, thus indicating that a decrease in the frequency $f$ is called for. Sensing of a deviation in the $f$ count of either sign beyond the predetermined limits by the M counter 16 upon the occurrence of a reference signal results in the provision of a "step" signal in output circuit 30 of the error sensing and correction circuit 17 which is coupled to the up/down counter 24 and which is also coupled to the M counter 16 so that the "step" signal clears the M counter, i.e., resets the same to a zero count. Thus, if a deficiency in the $f$ count is sensed, an "up" or frequency increase signal is applied to the up/down counter along with one "step" pulse so that the up/down counter 24 counts-up one step thereby making a one-increment increase in the frequency $f$. If this increase is insufficient to bring the deviation to zero, or within the predetermined limits, another "step" pulse will be provided in response to the next successive reference signal which will cause the up/down counter to count-up one additional step and thus to make a further one-increment upward correction in the frequency $f$. This process will then be repeated until such time as the deviation in the $f$ count has been restored to zero or within the predetermined limits, as will be hereinafter described. If thereafter, an excess in the $f$ count is detected, a "down" signal will be applied to the up/down counter together with one "step" pulse which will cause the up/down counter 24 to count-down one count from its previous count, thereby to apply a one-increment "down" correction to the frequency $f$.

The signals of the second train of pulses of frequency $m$ appearing in the output circuit 20 of the M counter 16 are applied to R counter 22 which continuously counts the signals of the second train. Input circuit 12 is also coupled to the R counter 22 to clear the same, i.e., the R counter 22 is reset to a zero count in response to each reference signal. It will thus be seen that when the frequency $m$ of the second train of signals provided in the output circuit 20 of the M counter 16 has been adjusted, by adjustment of the frequency $f$, as above-described, so that R is an integer, the count of the signals of the second train accumulated in the R counter 22 between one reference signal and the next will be exactly the integer R.

The output circuits 32 of the R counter 22, which is a bistable counting chain, are coupled to an R buffer register 33, which likewise is a bistable chain. Input circuit 12 is coupled to the R buffer storage chain 33 and thus each reference signal transfers the R count previously accumulated in the R counter 22 to the R buffer register 33 for subsequent comparison with, i.e., division by, the frequency $f$ during the next period of the reference signals.

In the illustrated embodiment, the division $f/R$ is performed by another bistable counting chain 34 coupled to the output circuit 15 of the oscillator 14 and thus counting the $f$ signals, and a bit comparator circuit 35 coupling the R buffer storage register 33 and the $f$ counter 34. Thus, each time the $f$ count accumulated in the $f$ counter 34 equals the R count stored in the R storage register 33, the bit comparator circuit 35 will sense this equality and provide an output signal in output circuit 13, and also provide a signal in circuit 36 coupling the bit comparator 35 to the $f$ counter 34 to clear or reset the same. Thus, one output signal pulse will be provided in output circuit 13 in response to every R pulse in the first train of frequency $f$, thus providing the train of output signals of frequency $\phi$ or M output pulses during each period of the reference signals S.

It will now be seen that the frequency $f$ provided by the voltage controlled crystal oscillator 14 will be increased by one increment if the M counter indicates a deficiency in the input $f$ pulses during one period of the reference signals S, and similarly that the frequency $f$ will be decreased by one increment if the M counter indicates an excess of input pulses $f$. When a frequency correction is made, the M counter is immediately cleared, i.e., reset to zero, the R count accumulated in the R counter 22 is transferred to the buffer 33, and the R counter 22 is cleared, i.e., reset to a zero count. This one-increment correction procedure continues at each successive reference signal until the sensed M count in the M counter 16 is zero upon the occurrence of a reference signal, or lies within the range of noise-attributable error in the reference signal, as will be hereinafter more fully described.

As soon as the corrections in the frequency $f$ cease to be necessary during each period of the reference signal, the system automatically begins an integration or averaging process by not clearing the M counter 16. The M counter 16 then acts as an algebraic adder which accumulates the signed sum of error in the frequency $f$ and/or reference pulse jitter error sampled at the occurrence of each reference signal. When this accumulated error exceeds, positively or negatively, the predetermined limits, a new correction in the frequency $f$ is made as above-described. This procedure produces a digital integration of error with a time constant, or number of samples averaged, determined automatically by the existing error, i.e., the larger the error, the more quickly corrections take place up to one correction per period of the reference signal, and the smaller the error, the longer the time in terms of number of periods of the reference signal which is required to determine the need for a change in the frequency $f$.

Referring now briefly to FIG. 3 in which like elements are indicated by like reference numerals, when high speed operation of the system shown in FIG. 2 is involved, i.e., the output frequency $\phi$ is a high frequency with the local oscillator frequency $f$ being correspondingly higher, problems with propagation time, gate delays, etc. are encountered. These problems may be overcome by more complex counting circuits, however, they are eliminated in a simple manner by operating the $f$ counter in a reverse counting mode and sensing a zero or near-zero count, with the $f$ counter then being preset to the count in the R buffer register 33. Thus, as shown in FIG. 3 and as will hereinafter be more fully described, a reverse $R_B$ counter 37 is provided coupled to the output circuit 15 of the oscillator 14 and to the R buffer register 33. The count loaded into the R buffer register 33 from the R counter 22 in response to each reference signal S is thus preset into the $R_B$ counter 37, which then counts-down the signals of frequency $f$ from the oscillator 14 to zero and provides a signal of the output train of frequency $\phi$ in response to completion of each such count-down operation.

Figure 4:
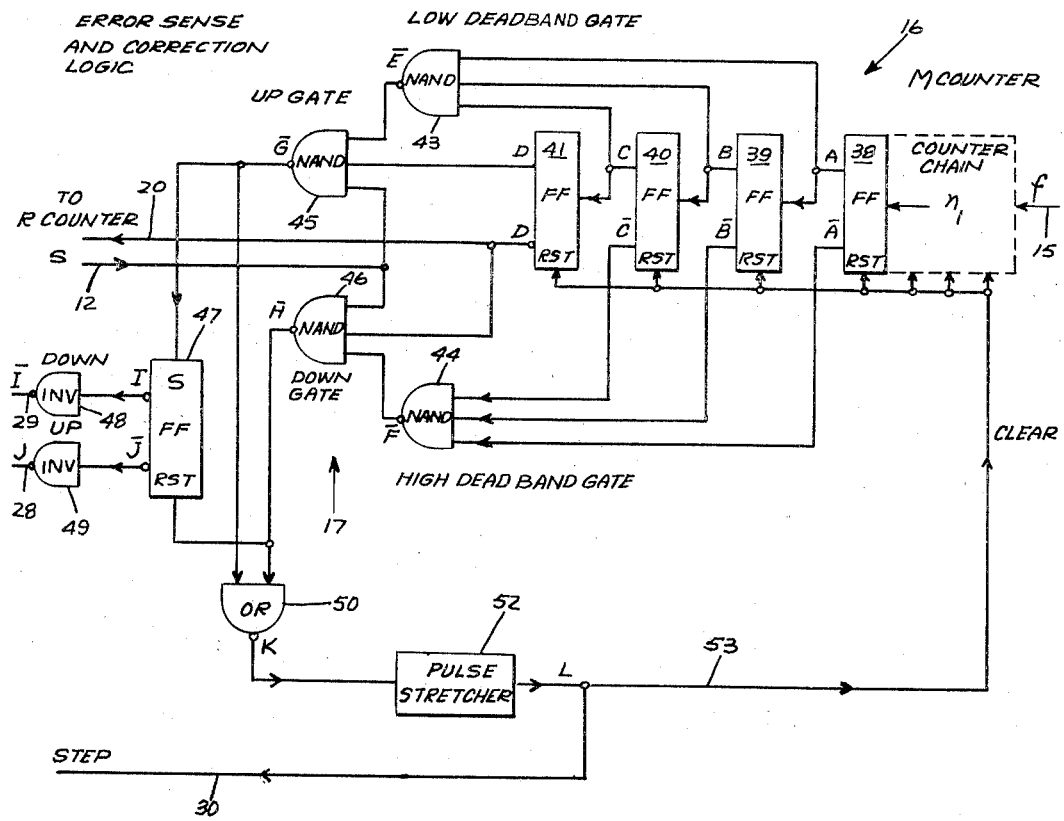
FIG. 4 is a schematic diagram showing the M counter and error sensing and correction logic circuitry of the system of FIG. 2.

Referring now to FIG. 4 in which a specific circuit for the M counter 16 and the error sensing and correction circuit 17 is shown, the M counter 16 comprises a chain of $n_1$ conventional bistable multivibrators for flip-flop circuits, only the last four being shown at 38, 39, 40 and 41. It will be seen that the "top side" outputs of the flip-flops 38, 39 and 40, identified at A, B and C, are respectively coupled to the trigger signal input circuit of the next higher-order flip-flop 39, 40 and 41, respectively. The top side outputs A, B and C of the flip-flops 38, 39 and 40 are also coupled to a conventional NAND gate 43, which functions as a low dead band gate, as will hereinafter be described. The "bottom side" outputs $\overline{A}$, $\overline{B}$ and $\overline{C}$ of the flip-flops 38, 39 and 40 are respectively coupled to another conventional NAND gate 44 which functions as a high dead band gate as will hereinafter be described. Output circuit 20 of the M counter 16 which is coupled to the R counter 22 is coupled to the bottom side output $\overline{D}$ of the final flip-flop 41.

The top side D of the final flip-flop 41, along with the output circuit $\overline{E}$ of the NAND gate 43 and the reference signal input circuit 12 are coupled to another NAND gate 45 which functions as an "up" gate. The bottom side $\overline{D}$ of the final flip-flop 41, together with the output $\overline{F}$ of the NAND gate 44 and the reference signal input circuit 12 are coupled to NAND gate 46 which functions as a "down" gate.

The output circuit $\overline{G}$ of the up NAND gate 45 is coupled to the "set" input circuit of flip-flop 47 while the output circuit $\overline{H}$ of the down NAND gate 46 is coupled to the "reset" input circuit of the flip-flop 47. The top side output I of flip-flop 47 is coupled by inverter 48 to the "down" output circuit 29 while the bottom side output J is coupled by inverter 49 to the "up" output circuit 28.

The $\overline{G}$ output of the "up" gate 45 and the $\overline{H}$ output of the "down" gate 46 are coupled to a NAND gate 50, which functions as an OR gate, having its output K coupled to a conventional pulse stretching circuit 52. Output circuit 53 of the pulse stretcher 52 is coupled to the "step" circuit 30 and to the "reset" circuits of the flip-flops comprising the M counter chain 16.

Referring now additionally to FIG. 5, the top side outputs A, B, C and D of the four highest order flip-flops 38, 39, 40 and 41 are shown. In the illustrated embodiment, it has been predetermined that an adequate "dead band," i.e., the period of time during which occurrence of a reference signal S will not provide a change in the frequency $f$, will be provided by the period of the output pulses provided by the fourth-from-last flip-flop 38. It will further be observed that the bottom side output $\overline{D}$ of the final flip-flop 41, which is applied to the R counter is of the frequency M above-referred to.

It will now be observed that the top side outputs A, B, C and D of the final four flip-flops 38, 39, 40 and 41 transition from "one" to "zero" at a count of M=zero. It will further be seen that the top side outputs A, B and C of next-to-last three flip-flops 38, 39 and 40 also transition from "one" to "zero" at a count of $M/2$ at which point the top side output D of the final flip-flop 41 transitions from "zero" to "one" (with the bottom side output $\overline{D}$ transitioning from "one" to "zero"). With the top side outputs A, B and C of the next-to-last three flip-flops 38, 39 and 40 being applied to the low dead band NAND gate 43, negative-going pulses 54–1, 54–2 and 54–3 having a duration equal to a half-cycle of the output pulses A of the flip-flop 38 will appear in its output $\overline{E}$ immediately prior to the M=zero and $M/2$ counts, as shown in FIG. 5$\overline{E}$. Likewise, with the bottom side outputs $\overline{A}$, $\overline{B}$ and $\overline{C}$ of the next-to-last three flip-flops 38, 39 and 40 being coupled to high dead band NAND gate 44, negative-going pulses 55–1, 55–2, 55–3 and 55–4 having a duration equal to a half-cycle of the output pulses A of the fourth-from-last flip-flop 38 will appear in its output $\overline{F}$ immediately following the counts of M=zero and $M/2$, as shown in FIG. 5$\overline{F}$.

It will now be observed that the output $\overline{E}$ of the low dead band NAND gate 43, together with the top side output D of the final flip-flop 41 and the positive-going reference pulses S are applied to the "up" NAND gate 45. It will thus be seen that if a reference signal S appears as at S–1 during the occurrence of the negative-going pulse 54–2 in the output $\overline{E}$ of the low dead band NAND gate 43, the output $\overline{G}$ of the "down" NAND gate 45 will continue at the "one" level. However, if a reference signal S–2 appears prior to appearance of the negative-going pulse 54–2, a negative going pulst 56 will appear in the output $\overline{G}$ of the "up" NAND gate 45, thus indicating that the frequency $f$ is too low and should be corrected in the "up" direction. It will be observed that neither of the reference signal pulses S–1 or S–2 will provide an output signal pulse in the output $\overline{F}$ of the high dead band NAND gate 44 since the bottom side outputs $\overline{A}$, $\overline{B}$ and $\overline{C}$ of the flip-flops 38, 39 and 40 are all in the "zero" state at that time.

It will further be observed that appearance of a reference signal pulse S–3 during the negative-going pulse 55–3 in the output $\overline{F}$ of the high dead band NAND gate 44 will result in no change in the "one" level of output $\overline{H}$ of the "down" NAND gate 46. However, appearance of a reference signal pulse S–4 following termination of the negative-going pulse 55–3 will result in generation of a negative-going pulse 57 in the output $\overline{H}$ of the "down" NAND gate 46, thus indicating that the frequency $f$ is too high and that it should be corrected in the "down" direction. It will further be seen that neither of the reference signal pulses S–3 or S–4 will produce an output signal in the output $\overline{G}$ of the "up" NAND gate 45 since the top side output D of the final flip-flop 41 is in the "zero" state since during that period. Thus, it will be seen that appearance of a reference signal S during the "dead band" will not result in the generation of an "up" or "down" correction signal, however, that an appearance of the reference signal pulse prior to the "dead band" will result in generation of an "up" correction signal pulse 56, while appearance of the reference signal pulse S following the dead band will result in generation of a "down" correction signal pulse 57.

It will now be seen that for each count of $f$ of $M=0$, a given integer R will result. Thus, for the count of $M=0$ indicated by the dashed line 58, a given count of $R=X$ will be provided whereas at the next lower M count of 0, indicated by the dashed line 59, a count of $R=X-1$ will be provided and at the next higher M count (off the page to the right in FIG. 5) an R count of $X+1$ will be provided. It will thus be seen that if a reference signal pulse S appears during a cycle of $m$ about $M=0$ where $R=X$, as shown by the arrows 60, an "up" or "down" correction signal pulse is provided to increase or decrease the frequency $f$ until R equals the integer X. However, if a reference signal S appears during the preceding cycle of $m$, as indicated by the arrow 62, "up" or "down" correctional signal pulses will be generated to increase or decrease the frequency $f$ until R equals the integer $X-1$. Likewise, if a reference signal pulse S appears during the next successive cycle of $m$, indicated by the arrow 63, "up" or "down" correction signal pulses will be generated to correct the frequency $f$ until R equals the integer $X+1$.

Recalling now that when a reference signal S appears prior to a respective dead band, for example the signal S-2, the frequency $f$ is too low and must be increased and contrariwise, if it appears after the respective dead band, such as the reference signal S-4, the frequency $f$ is too high and must be decreased, application of an "up" pulse 56 appearing in the output $\overline{G}$ of the "up" NAND gate 45 to the "set" circuit of the flip-flop 47 will cause its top side output I to transition from "zero" to "one," as shown in dashed lines at I-1 and I-2, the inverter 48 providing an inverted signal $\overline{I}$-1 and $\overline{I}$-2, as shown in solid lines. This setting of flip-flop 47 will result in its bottom side output J transitioning from "one" to "zero" as shown in dashed lines J-1 and J-2, the inverter 49 inverting that signal to provide a "zero" to "one" transition as shown in solid lines at J-1 and J-2. It is thus seen that as a result of an "up" signal pulse 56, a "one" or frequency increase signal J-2 is provided in the "up" output circuit 28. It will be readily understood that the flip-flop 47 remains "set" until "reset" and contrariwise remains "reset" until "set." Thus, if the flip-flop 47 was already in the "set" condition at the time of the occurrence of the "up" signal pulse 56, it will remain in this condition with the "one" or increase signal J-2 remaining in output circuit 28.

Assuming now that the flip-flop 47 had previously been "set" to provide a "one" or frequency increase signal J-2 in the "up" output circuit 28, occurrence of a "down" signal pulse 57 in output $\overline{H}$ of the "down" NAND gate 46 applied to the "reset" circuit of flip-flop 47 would reset the same thereby to cause the top side output I to transition from "one" to "zero," as shown in dashed lines at I-2 and I-3 with the inverted output $\overline{I}$ appearing in the "down" output circuit 29 transitioning from "zero" to "one," as shown at $\overline{I}$-2 and $\overline{I}$-3, thereby providing a "one" or frequency decrease signal in the output circuit 29. At the same time, of course, the inverted output J in the "up" output circuit 28 will transition from "one" to "zero," as shown at J-2 and J-3, thus removing the frequency increase correction signal from the "up" output circuit 28.

Application of either the "up" signal pulse 56 or the "down" signal pulse 57 to the OR gate 50 results in appearance of a positive-going pulse 58-1 or 58-2 in its output K, these pulses being respectively stretched by the pulse stretcher 52 as at 59-1 or 59-2 to provide a "step" pulse for application to the up/down counter 24 and a clearing or resetting pulse to the flip-flops of the M counter chain 16.

Referring now to FIG. 6, the up/down counter 24 comprises a bistable counting chain having $n_2$ counters, only one of which is shown. Here, the "step" signal output circuit 30 is coupled to the trigger signal input circuit of the first flip-flop 60. The top side output circuit 62 of the flip-flop 60 along with the "down" output circuit 29 is coupled to NAND gate 63, while the bottom side output circuit 64 along with the "up" output circuit 28 is coupled to another NAND gate 65. The output circuits 66 of the NAND gates 63 and 65 along with the "step" output circuit 30 are coupled to NAND gate 67 which has its output circuit 68 coupled by inverter 69 to the trigger input circuit of the next flip-flop of the chain. The bottom side output circuit 64 of the flip-flop 60, along with the bottom side output circuits of the remaining flip-flops of the chain, are coupled to the digital-to-analog converter 26, which has its output circuit 27 coupled to the voltage control crystal oscillator 14. This counting chain configuration is employed so that the up/down counter 24 does not lose count in the process of counting "up" or "down." Thus, assuming that the frequency $f$ is sensed to be too low, as above-described, a "one" signal will appear on the "up" line 28, and will remain until the frequency $f$ is increased to the point at which the reference signal pulse S appears within the "dead band" as above-described. Further, a "step" pulse 59 will appear in the "step" circuit 30 in response to each reference signal pulse S so long as the frequency $f$ is too low. The up/down counter chain 24 will thus, in the presence of the "up" signal on line 28, count these "step" pulses 59 upwardly, applying corresponding signals in its output circuits 25 to the digital-to-analog converter 26 which thus applies one step at a time incremental voltage changes to the voltage controlled crystal oscillator 14 thereby to increase the frequency $f$ in one-step increments, i.e., one increment in response to each cycle of the reference signal S, until the frequency $f$ has been corrected. At this point, the "step" pulses 59 will terminate, however, the "up" signal on the "up" line 28 will remain until such time as the frequency $f$ becomes too high, i.e., a reference signal pulse S appears following the "dead band," thus generating a "down" signal pulse 57 and, in turn, a "down" signal on the "down" line 29. When such an event occurs, the "step" pulses 59 will again be provided respectively in response to each reference pulse S and the up/down counter chain 24 will, in the presence of the "down" signal on line 29 count these "step" pulses "down" from the previous count, causing the digital-to-analog converter 26 to apply corresponding incremental voltage changes, one step at a time, to the voltage controlled crystal oscillator 14 until the frequency $f$ is reduced to bring the reference pulses S within the dead band.

The operation of the up/down counting chain 24 is identical to the operation of a mechanical stepping switch which may be employed where only a relatively small number of voltage increments or steps are required for control of the variable frequency crystal oscillator 14. Such a mechanical stepping switch is shown at 24a in FIG. 7. Here, a voltage divider 70 is coupled between the sides 72 and 73 of a suitable source of direct current potential. Voltage divider 70 is provided with a plurality of taps 74 which are respectively coupled to the stationary contacts 75 of the stepping switch 24a. The movable contact or wiper arm 76 is coupled to the output circuit 27 which, in turn, is coupled to the voltage controlled crystal oscillator 14 to apply thereto the particular incremental voltage derived from the voltage divider 70 depending upon the particular contact 75 which is engaged by the movable contact wiper arm 76.

Wiper arm 76 is actuated in the "down" or frequency decreasing direction by operating coil 77, and is moved in the "up" or frequency increasing direction by another operating coil 78. Relay operating coil 79 is coupled in series with the "step" circuit 30 and is thus energized to close its contacts 80 in response to each "step" pulse 59. Contacts 80, when closed, respectively couple the "down" and "up" operating coils 77 and 78 in series with the "down" and "up" lines 29 and 28. Thus, assuming that the wiper arm 76 of the stepping switch 24a is in the position shown in FIG. 7 and that a "down" signal appears on the "down" line 29, each appearance of a "step" pulse 59 on the "step" line 30 will result in energization of relay coil 79, closing of its contacts 80, and energization of the operating coil 77 to advance the wiper arm 76 one step in the direction shown by the arrow 82. Assuming now that the "step" pulses 59 continue, one step at a time respectively in response to successive reference signals S, untill the wiper arm 76 has reached the position shown in the dashed lines 76a in FIG. 7 and then terminate, a corresponding voltage derived from the respective tap 74a on the voltage divider 70 will have been applied to the voltage controlled crystal oscillator 14 to reduce the frequency $f$ to the requisite value so that the reference signal pulse S appears within the "dead band."

Now, assuming further that the frequency of the reference signals S changes so that the reference signal pulse S now appears prior to the "dead band" thus indicating that the frequency $f$ is too low and should be increased, the signal on the "down" line 29 will be terminated, an "up" signal will appear on the "up" line 28, and one or more "step" pulses 59 will appear in the "step" circuit 30 thereby energizing relay coil 79, closing contacts 80 and energizing operating coil 78 so as to move the wiper arm 76 in the direction shown by the arrow 83, one step at a time, until the voltage from the voltage divider 70 applied to the voltage controlled crystal oscillator 14 has been increased sufficiently so as to increase the frequency $f$ to restore the reference signal S to the dead band.

Referring now to FIG. 8, the R counter 22 comprises a bistable counting chain having $n_3$ flip-flops, only two of which are shown. The output circuit 20 from the M counter 16 is coupled to the trigger input circuit of the first flip-flop 84, which has its top side output circuit 85 coupled to the triggering circuit of the second flip-flop 86, and so on, as is well known to those skilled in the art. The R buffer storage register 33 comprises a bistable storage chain having $n_4$ flip-flops, only two of which are shown. The top and bottom output circuits 85 and 87 of the first flip-flop 84 of the R counter 22 are respectively coupled to the corresponding input circuits of the first flip-flop 88 of the R buffer register chain 33, the top and bottom output circuits 89 and 90 of the second flip-flop 86 of the R counter chain 22 are respectively coupled to the corresponding circuits of the second flip-flop circuit 92 of the R buffer register chain 33, and so on.

Input circuit 12 which receives the reference signal pulses S is coupled to an inverter 93, which has its output circuit 94 coupled to a conventional pulse stretching circuit 95. The output circuit 96 of the pulse stretcher 95, along with the output circuit 94 of the inverter 93 are coupled to a NAND gate 97 which has its output circuit 98 coupled to the clear or "reset" circuits of the flip-flops of the R counter chain 22. Output 94 of the inverter 93 is also coupled by inverter 99 to the triggering circuits of the flip-flops of the R buffer register chain 33 thereby respectively to load those flip-flops with the respectively corresponding outputs of the flip-flops of the R counter chain 22.

Referring briefly to FIG. 9 in conjunction with the portion of FIG. 8 thus-far described, application of a positive-going reference signal pulse S to the inverter 93 results in the appearance of a negative-going pulse $\bar{S}$ in its output circuit 94. Application of the negative-going pulse $\bar{S}$ to the pulse stretcher 95 results in the provision of a stretched pulse 100 in the output circuit 96. Application of the negative-going pulse $\bar{S}$ and the stretched pulse 100 to the NAND gate 97 results in the provision of a negative-going pulse 102 in its output circuit 98 which is applied to the "reset" circuits of the flip-flops of the R counter chain 22 to reset the same. It will be observed that a negative-going pulse $\bar{S}$ is reinverted by the inverter 99 so as to apply the positive-going reference signal pulse S to the flip-flops of the R buffer register chain 33 so as to load the same, provision of the pulse stretching circuit 95 and the NAND gate 97 insuring that the clearing pulse 102 is applied to the flip-flops of the R counter chain 22 after the count previously accumulated therein has been transferred to the R buffer register chain 33.

The $R_B$ counter and comparator circuit 37 comprises a bistable counting chain having $n_5$ flip-flops, only four of which are shown. Output circuit 15 of the local oscillator 14 is coupled to two NAND gates 103 and 104. The output circuit 104 of the NAND gate 103 is coupled by inverter 105 to the trigger circuit of the first flip-flop 106 of the $R_B$ counter and comparator counting chain 37. The bottom side output circuit of flip-flop 106 is coupled to the trigger circuit of the second flip-flop 107, the bottom side output circuit 108, 110 and 112 of flip-flops 107, 109, 111 being respectively coupled to the trigger circuits of the next higher order flip-flop, as is well known. The top and bottom output circuits of the flip-flops 80, 92 et seq. of the R buffer register chain 33 are respectively coupled to NAND gates 113 and 114, 115 and 116 which respectively have their output circuits coupled to the "set" and "reset" circuits of the flip-flops 106, 107 et seq. of the $R_B$ counter and comparator chain 37. Output circuit 15 of the local oscillator 14 together with the bottom side output circuit 108 and 112 of flip-flops 107 and 111 and the bottom side output circuits of all of the remaining higher order flip-flops of the $R_B$ counter 37 are coupled to disable NAND gate 117, which has its output circuit 118 coupled to the "set" circuit of disable flip-flop 119.

Output circuit 120 of NAND gate 104 coupled by inverter 121 to the trigger circuit of flip-flop 122 and to NAND gate 123. The top side output circuit of flip-flop 122 is coupled to the trigger circuit of flip-flop 123 and to the NAND gate 124.

The top side output circuit of flip-flop 123 is likewise coupled to the NAND gate 124. Output circuit 125 of NAND gate 124 coupled to the "reset" circuits of flip-flops 119, 122 and 123 and to ground by a timing capacitor 126. The top side output circuit 127 of the disable flip-flop 119 is coupled to the NAND gate 104, and the bottom side output circuit 128 is coupled by driver-inverters 129, 130 to the NAND gates 113, 114 et seq. and NAND gates 115, 116 et seq. respectively, Inverter 30 is also coupled to the output circuit 13.

As previously stated, the $R_B$ counter 37 is arranged to count the signals $f$ provided by the local oscillator 14 in the reverse direction from the preset count appearing in the R buffer register chain 33, to zero. However, in the illustrated embodiment, the frequency of the local oscillator pulses $f$ is on the order of ten megacycles. At this high frequency, there is insufficient time to preset the $R_B$ counter 37. The circuit including the flip-flops 119, 122 and 123 is provided in order to disable and preset the $R_B$ counter 37 a predetermined number of input pulses $f$ in advance of a count of zero and to generate an ouput pulse $\phi$ having the same duration.

Referring now to FIG. 10 in addition to the $R_B$ counter portion of FIG. 8 above-described, the final seven pulses $f$ are shown together with the corresponding count of seven down to zero. The corresponding top side outputs (not employed) of the first four flip-flops 106, 107, 109, 111 are shown together with the bottom side outputs $\bar{D}$ and $\bar{E}$ of flip-flops 107 and 111, shown in dashed lines. It will be readily understood that in this final counting-down operation of the $f$ pulses, the top side and bottom side outputs of all of the flip-flops of higher order than the flip-flop 111 will be identical to the respective outputs of the flip-flop 111.

The output $\overline{F}$ of the disable NAND gate 117 is normally in the "one" condition so that the top side output G of the disable flip-flop 119 is normally in the "zero" state. The output $\overline{H}$ of the NAND gate 104 is thus normally in the "one" state. However, application of the bottom side $\overline{D}$ and $\overline{E}$ signals to the NAND gate 170 along with the fifth from last $f$ pulse provides a negative-going pulse 132 in output $\overline{F}$ of the disable NAND gate 117, the trailing edge of which "sets" the disable flip-flop 119 to initiate a positive-going signal 133 in its top side output G. The inverted bottom side output $\overline{G}$ as inverted (and amplified) by the driver-inverter 130 becomes the output pulse M.

Application of the positive-going signal 133 in the top side output circuit G of the disable flip-flop 119 to the NAND gate 104 along with the fourth, third, second and first positive-going $f$ pulses provides negative-going pulses 134–1, 134–2, 134–3 and 134–4 in its output $\overline{H}$, which are respectively inverted by the inverter 121, as shown in dashed lines at H. The inverted pulses 134–1, 2, 3 and 4 are applied to NAND gate 124 and flip-flop 122 which, together with flip-flop 123 forms a two-stage counting chain. Thus, as will be seen, upon the occurrence of the last $f$ pulse and, in turn, the fourth inverted pulse 134–4, positive-going signals 134–4 (inverted as at H), 135 and 136 are applied to the NAND gate 124 which thus generates negative-going pulse 137 in its output $\overline{I}$, this pulse being applied to reset the disable flip-flop 119 and the flip-flops 122, 123 which thus terminates the output pulse 133; it will be observed that the inverted pulse 133 applied to the NAND gates 113 and 114, 115 and 116 permits resetting of the flip-flops of the $R_B$ counter chain 37 to the count previously stored in the R buffer register 33 during the final four pulses $f$ during which the $R_B$ counter chain 37 is disabled. In this connection it will be observed that the negative-going output signal provided at the bottom side output $\overline{G}$ of the flip-flop 119 is applied to the NAND gate 103 thus disabling the same to inhibit application of the last four $f$ pulses to the $R_B$ counter chain 37, this pulse, as inverted at 133 being applied to the NAND gates 113, 114, 115 and 116 to enable the same to permit resetting of the $R_B$ counter 37 to the count previously stored in the R buffer register 33 during the occurrence of the final four $f$ pulses.

Referring now to FIG. 11A, there is shown a timing diagram for the system and method of the invention in which the reference signals $f$ have a period of $P_1$, and the local oscillator frequency $f$ is in exact harmonic relationship with $P_1$ and equals 50S. Here, it is desired that exactly ten equally spaced clock pulses be generated during the period of the reference signals $P_1$, i.e., $M=10$. Thus, the M counter 16 repeatedly counts the pulses of the local oscillator frequency $f$ from zero to ten and it will be observed that under the conditions illustrated in FIG. 11A, exactly five of such M counts of ten occur during the period $P_1$ of reference signals S, i.e., the frequency $f=50S$.

It will further be observed that under these conditions, the frequency $m$ of the output pulses provided by the M counter 16 is in exact harmonic relationship with the frequency of the reference signals S, i.e., the last M pulse generated during the period $P_1$ terminates coincident with occurrence of the second reference signal S–2. Thus, under these conditions, no correction in the frequency $f$ will take place and the M counter 16 will merely continue with its count.

It will further be seen that exactly five R pulses are counted by he R counter 22 during the first period of the reference signals between reference signals S–1 and S–2, this R count of five being loaded into the R buffer 33 in response to the second reference signal S–2. Then, during the second period between the reference signals S–2 and S–3, the R count of five is divided into the $f$ pulses generated during the second period resulting in the generation of exactly ten equally spaced output pulses $\phi$ during that period. It will be observed that under these conditions, an R count of five when divided into the fifty local oscillator pulses $f$ generated during one period $P_1$ of the reference signal S provides the requisite ten output clock pulses $\phi$.

Referring now to FIG. 11B, in which it is assumed that M remains 10 and that the local oscillator frequency $f$ remains unchanged from that shown in FIG. 11A, it is further assumed that the frequency of the reference signals S has suddenly increased to provide a period $P_2$. It is assumed however that the change in the frequency of the reference signals S has been such that now exactly forty reference signal pulses $f$ are generated during the period $P_2$, and thus that the frequency $m$ of the output pulses provided by the M counter 16 is still in exact harmonic relationship with the frequency of the reference signals $f$ i.e., that the last M pulse generated during the period $P_2$ again terminates coincident with the occurrence of the reference signal pulse S–2. Here, however, it will be observed that the R counter 22 provides only four R pulses during the period $P_2$ between the reference signals S–1 and S–2, this R count of four being loaded into the R buffer 33 by the second reference signal pulse S–2, and then divided into the 40 $f$ pulses generated during the second period between reference signal pulses S–2 and S–3, again to provide exactly ten equally spaced output clock pulses $\phi$ during the second period. Here, it will be observed that an R count of four when divided into the number of local oscillator pulses $f$ generated during each period $P_2$ of the reference signals S again provides the requisite ten output clock pulses. Referring now to FIG. 11C, with M again assumed to be ten and the local oscillator frequency $f$ assumed to be initially the same as that prevailing in FIGS. 11A and B, it is here assumed that the frequency of the reference signals S has suddenly decreased slightly to provide the period $P_3$. Here, it will be observed that M counter 16 will count out four groups of ten $f$ pulses plus another three by the time of the occurrence of the second reference signal S–2, and it will be further observed that the frequency $m$ of the output pulses provided by the M counter 16 is no longer in exact harmonic relationship with the frequency of the reference signals S but rather than that last M pulse provided during the period $P_3$ has terminated prior to occurrence of the second reference signal S–2. It will thus be readily seen that the local oscillator frequency $f$ is now too high by three pulses. It is further assumed that "dead band" has a width of two $f$ pulses, i.e., one $f$ pulse on either side of an M count of 10 (or zero). It will thus be seen that the second reference signal S–2 occurs outside of the "dead band." that the $f$ frequency is too high, and thus that a "down" signal together with a "step" pulse will be provided to the up/down counter 24, as above-described, thus to decrease the frequency $f$.

It is here assumed that a one-step correction in the frequency $f$ is all that is required and it will thus be seen that with this one-step reduction in the local oscillator frequency $f$, the M counter 16 now counts exactly four groups of ten $f$ pulses during the second period between the reference signals S–2 and S–3. Thus, during the second period, the frequency $m$ of the output pulses provided by the M counter is again in exact harmonic relationship with the frequency S with the last M pulse generated during the second period terminating coincident with the third reference signal S–3.

It will be observed that an R count of four was provided by the R counter 22 during the first period, this count again being loaded into the R buffer 33 in response to the second reference signal S–2, and divided into the $f$ pulses of corrected frequency generated during the second period again to provide the requisite ten output clock pulses during the second period.

Referring now to FIG. 11D, it is again assumed that M equals ten and that the local oscillator frequency $f$ is initially the same as that which prevailed after the correction thereto in FIG. 11C. Here, however, it is assumed that the frequency of the reference signals S has again suddenly increased to provide a period $P_4$. Here, it will be observed that the M counter 16 now counts three groups of ten $f$ pulses plus nine (or four groups minus one, i.e., the fourth group is minus one $f$ pulse) upon the occurrence of the second reference signal pulse S–2. It will now be observed that the frequency $m$ of the output pulses provided by the M counter 16 is not in exact harmonic relationship with the frequency of the reference signals S, the last M pulse terminating after the occurrence of the reference signal S–2, thus indicating that the local oscillator frequency $f$ is too low. However, it will be observed that the second reference signal S–2 occurs during the "dead band" and thus, no correction in the local oscillator frequency $f$ is made at this point since the bottom side output of the final flip-flop 41 of the M counter 16 (FIGS. 4 and 5) is applied to the R counter 22. It will be observed that an R count of four is again provided by the R counter 22 during the first period between the reference signals S–1 and S–2. This count is again loaded into the buffer 33 by the second reference signal S–2 and divided into the local oscillator pulses $f$ generated during the second period. Recalling now that the M counter 16 is cleared or reset only when a frequency correction is made, it will be observed that the M counter is not reset upon the occurrence of the second reference signal S–2 and thus continues its repetitive count of groups of ten local oscillator signals $f$. Thus, upon the appearance of the third reference signal S–3, it will be observed that the M counter 16 has counted three groups of ten $f$ signals pluse eight, i.e., with the fourth group being minus two signals. It will now be observed that the third reference signal S–3 occurs prior to the "dead band" thus providing an "up" signal and a "step" pulse to the up/down counter 24 thereby to increase the frequency $f$ provided by the local oscillator 14 by one step.

It will again be observed that the R count of four provided by the R counter 22 during the first period between the reference signals S–1 and S–2 was loaded into the R buffer 33 in response to the second reference signal S–2 and then divided into the local oscillator pulses $f$ generated during the second period between the reference signals S–2 and S–3. However, during this period which was prior to correction of the local oscillator frequency $f$, only 39 pulses $f$ were generated and thus only nine output clock pulses were provided.

Considering now the third period between the reference signal pulses S–3 and S–4, it is again assumed that a one-step increase in the local oscillator frequency $f$ is all that is required. Thus, during this period, exactly four groups of ten pulses $f$ are counted by the M counter 16, the frequency $m$ of the output pulses provided by the M counter 16 is again in exact harmonic relationship with the frequency of the reference signals S, and since forty local oscillator pulses $f$ are now generated during the third period (as the result of the increase in the frequency $f$), division of the R count of four provided during the second period and loaded into the R buffer 33 in response to the third reference signal S–3, into the forty pulses $f$ will now provide the requisite ten output clock pulses $\phi$.

In the event that a one-step increase in the local oscillator frequency $f$ was insufficient, i.e., so that the fourth reference signal pulse S–4 still appeared prior to the "dead band," the requisite number of successive one-step corrections would be made, one each period, until the frequency $f$ had been increased to the point where the next reference signal pulse S occurs during the "dead band." It will be observed, however, that only a small correction, in either direction, in the local oscillator frequency $f$ is required in order to bring the frequency $m$ of the output of the M counter into exact harmonic relationship with the frequency of the reference signals since it is only necessary to correct the local oscillator frequency sufficiently to bring the trailing edge of the last M pulse generated during any period of the reference signal into coincidence with a reference signal pulse (or within the "dead band"). More particularly, it will be observed that the change in the local oscillator frequency $f$ is only that required to restore ΔR to zero (or within the "dead band") and thus that the maximum change in the frequency $f$ required is plus or a minus ½ R or a maximum range of local oscillator frequency variation of 1/R. However, inspection of FIG. 11A will indicate that the system and method of the invention will accommodate a much greater and extremely broad range or variation in the frequency of the reference signals S. More particularly, considering the frequency of the reference signal S shown in FIG. 11A (providing a period $P_1$), it will be seen that philosophically (ignoring circuitry limitations) the frequency S can be increased by approximately 800% so long as a minimum R count of one is provided, and that in the other direction, and again philosophically, the frequency S can be decreased almost to infinity provided a finite R count is still provided. Thus, it will be seen that the system and method of the invention accommodates an extremely wide variation in the frequency of the reference signals by automatic variation in the R count, which is provided by a much smaller variation in the local oscillator frequency $f$ of 1/R. It will thus be seen that with R counts substantially higher than those indicated in the assumed examples of FIG. 11, i.e., in the hundreds, a three or four-to-one variation in the frequency of the reference signals can be accommodated with only a minute change in the local oscillator frequency $f$ thus permitting employment of a highly stable voltage controlled crystal oscillator.

In the above-referred to satellite application for the system and method of the invention, the selection of the integer M was based on the number of resolution elements required which was nominally 32,400 elements per rotation. Thus, for greater ease of implementation, the binary number of 32,768 was chosen for M. In this application, the minimum satellite rotational speed was 60 r.p.m. and thus the minimum sun pulse frequency is 60 cycles per minute or one cycle per second. Thus, the maximum R count will occur at that minimum satellite speed. With $f=MRS$, and with the minimum S being 1 and with M having been chosen to be 32,768, a maximum R count of 329 was selected yielding a center oscillator frequency of 10.781 megacycles. In this application, the satellites' rotational speed is subject to variation from 60 r.p.m. to approximately 140 r.p.m. With these parameters, the R count varied from 329 at 60 r.p.m. to 140 at 141 r.p.m., variation in the frequency $f$ from the center frequency of 10.781 megacycles in order to maintain $M=32,768$ being only approximately ±.017 megacycle at 60 r.p.m. with $R=329$ and only approximately ±.038 megacycle at 141 r.p.m. with $R=140$, this variation being within the permissible range of frequency variation of a voltage controlled crystal oscillator. In this specific application, the M counter 16 is provided with fifteen binary stages, the R counter 22, R buffer register 33 and the $R_B$ counter 37 were each provided with nine stages, and the up/down counter 24 was provided with twelve binary stages which, in turn, provided a total 4096 voltage increments or steps, i.e., 2048 steps respectively up and down from the center frequency.

While there have been described above the principles of this invention in connection with specific apparatus, it is to be clearly understood that this description is made only by way of example and not as a limitation to the scope of the invention.

What is claimed is:

1. An adaptive system for generating a train of output signals having a frequency $\phi$ which is a predetermined integral multiple M of a train of reference signals having a frequency S, said system comprising: means for generating a first train of signals having a frequency $f$; first means for dividing said frequency $f$ by the integer M to provide a second train of signals having a frequency $m$; means for sensing the direction and magnitude of any deviation $\Delta R$ of said frequency $m$ from another integral multiple R of said frequency S; means responsive to said sensing means for varying said frequency $f$ to reduce said deviation $\Delta R$ to zero; and second means for dividing said frequency $f$ by the integer R thereby to provide said frequency $\phi$.

2. The system of claim 1 further comprising an input circuit means for receiving said reference signals, and wherein said generating means includes a variable frequency oscillator, said input circuit means being coupled to said sensing means for actuating the same in response to a said reference signal, said sensing means being coupled to said oscillator for varying the frequency thereof.

3. The system of claim 1 wherein said second dividing means includes means for counting the number of signals of said second train occurring during each period of said reference signals thereby providing a count of R, and means for dividing said frequency $f$ by said R count.

4. The system of claim 1 wherein said first dividing means includes means for continuously counting the signals of said first train and for providing a signal of said second train in response to each M signal of said first train.

5. The system of claim 4 wherein said sensing means includes means for providing an error signal in response to the sensing of a said deviation, said counting means including means for resetting the same to a zero count in response to each said error signal.

6. The system of claim 1 wherein said second dividing means inclues first means for counting the signals of said second train, means for resetting said first counting means to a zero count in response to each said reference signal whereby said counting means provides a count of R during each period of said reference signals, buffer count storage means, means for transferring each said count R previously accumulated in said first counting means to said storage means in response to each said reference signal, second means for counting the signals of said first train, and means for comparing the count in said storage means with the count in said second counting means and for providing a signal of said output train in response to each R signal of said first train.

7. The system of claim 6 wherein said comparing means includes means for presetting said second counting means to the count in said storage means, said second counting means being arranged to count-down the signals of said first train from said preset count toward zero.

8. The system of claim 1 further comprising input circuit means for receiving said reference signals, said first dividing means including means for repeatedly counting the signals of said first train from zero to M and for providing a signal of said second train in response to each said count, said sensing means being coupled to said input circuit means and including means coupled to said ciunting means for detecting in response to a said reference signal whether said count differs from zero in excess of a predetermined count and the direction of such difference and for providing a first correction signal when said excess is in one direction and a second correction signal when said excess is in the other direction, said generating means including a variable frequency oscillator, and further comprising means coupling said detecting means to said oscillator for respectively increasing and decreasing the frequency thereof in response to said correction signals, said detecting means including means for resetting said counting means to a zero count in response to a said correction signal.

9. The system of claim 8 wherein said resetting means includes means for providing an error signal in response to either of said correction signals, said error signal resetting said counting means, said coupling means being coupled to said resetting means and including second means for counting said error signals in one direction in response to said first correction signal and in the opposite direction in response to said second correction signal, and means coupling said second counting means to said oscillator for varying the frequency thereof in response to the count in said second counting means.

10. The system of claim 9 wherein said first-named and second counting means are bistable counting chains, said oscillator being a voltage controlled crystal oscillator, and said last-named coupling means is a digital-to-analog converter.

11. The system of claim 8 wherein said reference signals are pulses with S being the repetition frequency thereof and being subject to variation, said first-named counting means being a first bistable counting chain coupled to said oscillator, said second dividing means including a second bistable counting chain coupled to said first counting chain for continuously counting the signals of said second train, means for resetting said second counting chain to a zero count is responsive to each reference pulse whereby said second counting chain provides a count of R during each period of said reference pulses, a buffer storage bistable register chain coupled to said second counting chain, means coupling said input circuit means to said buffer register chain for transferring each said count R previously accumulated in said second counting chain to said buffer register chain in response to each said reference pulse, and a third bistable counting chain coupled to said oscillator for continuously counting the signals of said first train, said buffer register chain being coupled to said third counting chain for presetting the same to the count toward zero in said buffer register chain, said third counting chain being arranged to count-down the signals of said first train from said preset count toward zero and to provide a said output signal in response to completion of said count-down.

12. The system of claim 11 further comprising means coupled to said third counting chain for generating a said output signal in response to a count which is a predetermined count short of a zero count and having a duration substantially equal to said predetermined short count, and means for enabling said third counting chain to receive a new count from said buffer register chain in response to each said output signal.

13. A method of generating a train of output signals having a frequency $\phi$ which is a predetermined integral multiple M of a train of reference signals having a frequency S comprising the steps of: generating a first train of signals having a frequency $f$; dividing said frequency $f$ by the integer M to provide a second train of signals having a frequency $m$; sensing the direction and magnitude of any deviation $\Delta R$ of said frequency $m$ from another integral multiple R of said frequency S; varying said frequency $f$ to reduce said deviation to zero; and dividing said frequency $f$ by the integer R thereby to provide said frequency $\phi$.

14. The method of claim 13 wherein said first-named dividing step comprises counting the signals of said first train and providing a signal of said second train in response to each M signals of said first train, said second-named dividing step comprising counting the number of signals of said second train occurring during each period of said reference signals thereby providing a count of R, and dividing said frequency $f$ by said count of R.

15. The method of claim 14 wherein said second-named dividing step further comprises storing the count of R accumulated during each said period, said last-named dividing step comprising counting the signals of said first train, comparing the stored R count with the count of the signals of said first train, and providing a signal of said output train in response to each count of R signals of said first train.

16. The method of caim 14 wherein said sensing step is performed in response to the occurrence of a said reference signal, and comprising the further step of terminating said counting of the signals of said first train and resuming the counting thereof from zero in response to a said deviation.

17. The method of claim 14 wherein said first-named counting step comprises repeatedly counting the signals of said first train from zero to M, and wherein said sensing step comprises determining whether the count of the signals of said first train differs from zero in excess of a predetermined count and the direction of such difference at the occurrence of a said reference signal, said varying step comprising decreasing said frequency $f$ in response to a said difference in one direction and increasing said frequency $f$ in response to a said difference in the other direction, and comprising the further step of terminating said counting of the signals of said first train and resuming counting thereof from zero in response to a said difference.

18. The method of claim 17 wherein said sensing step comprises the further steps of generating a first correction signal when said difference is in one direction and a second correction signal when said difference is in the other direction, generating an error signal in response to a said difference in either direction, counting said error signals in one direction in response to said first correction signal and in the opposite direction in response to said second correction signal, said varying step further comprising varying said frequency one increment at a time in response to each said error signal.

19. The method of generating a predetermined integral number M of equally spaced timing signals during the period between recurrent events comprising the steps of: providing a reference signal in response to each said event; generating a train of first signals having a frequency $f$; dividing said frequency $f$ by said number M thereby to generate a train of second signals; sensing the direction and magnitude of any deviation in the number of cycles of said second signals occurring during a said period from an integral number R; adjusting said frequency $f$ to reduce said deviation to zero; counting the number of cycles R of said second signals generated in a said period; and dividing said frequency $f$ by said number R.

No references cited.

JOHN KOMINSKI, Primary Examiner

U.S. Cl. X.R.

331—1, 14